(12) United States Patent
Morinaga et al.

(10) Patent No.: US 8,625,972 B2
(45) Date of Patent: Jan. 7, 2014

(54) RECORDING SYSTEM, TRANSMISSION APPARATUS, RECORDING APPARATUS, RECORDING CONTROL METHOD, AND RECORDING MEDIUM

(75) Inventors: Takeo Morinaga, Kanagawa (JP); Masahiko Sato, Tokyo (JP)

(73) Assignee: Sony Corporation (JP)

( * ) Notice: Subject to any disclaimer, the term of this patent is extended or adjusted under 35 U.S.C. 154(b) by 860 days.

(21) Appl. No.: 12/386,246

(22) Filed: Apr. 15, 2009

(65) Prior Publication Data

US 2009/0274447 A1    Nov. 5, 2009

(30) Foreign Application Priority Data

Apr. 21, 2008   (JP) ................ P2008-110747

(51) Int. Cl.
*H04N 5/92*    (2006.01)
(52) U.S. Cl.
USPC ....... 386/326; 386/231; 386/239; 386/E5.001
(58) Field of Classification Search
USPC ............. 386/231, 239, 326, E5.001
See application file for complete search history.

(56) References Cited

U.S. PATENT DOCUMENTS

| | | | |
|---|---|---|---|
| 6,748,485 B1 | 6/2004 | Yokota et al. | |
| 2004/0175098 A1* | 9/2004 | Calhoon et al. | 386/46 |
| 2005/0265169 A1 | 12/2005 | Yoshimaru et al. | |
| 2005/0271359 A1 | 12/2005 | Nakai | |
| 2006/0104604 A1 | 5/2006 | Sampei et al. | |
| 2006/0115239 A1 | 6/2006 | Shimazaki et al. | |
| 2008/0072072 A1* | 3/2008 | Muraki et al. | 713/193 |

FOREIGN PATENT DOCUMENTS

| | | |
|---|---|---|
| GB | 2408842 A | 6/2005 |
| GB | 2421601 A | 6/2006 |
| JP | 08286836 A | 11/1996 |
| JP | 11027225 A | 1/1999 |
| JP | 2000076790 A | 3/2000 |
| JP | 2001-125833 | 5/2001 |
| JP | 2002525779 T | 8/2002 |
| JP | 2003087699 A | 3/2003 |
| JP | 2004054988 A | 2/2004 |
| JP | 2005216118 A | 8/2005 |

(Continued)

OTHER PUBLICATIONS

European Search Report, EP 09158274, mailed Jul. 15, 2009.

(Continued)

*Primary Examiner* — Gelek W Topgyal
*Assistant Examiner* — Girumsew Wendmagegn
(74) *Attorney, Agent, or Firm* — Lerner, David, Littenberg, Krumholz & Mentlik, LLP (57) ABSTRACT

A recording system includes a transmission apparatus and a recording apparatus. The transmission apparatus includes a storage unit that stores content data, a generating unit that generates recording destination information, and a transmission control unit that transmits the recording destination information and the content data. The recording apparatus includes a first recording unit that records content data, a second recording unit that records content data at a lower recording speed, and a recording control unit that controls the first and second recording units. The transmission control unit continuously transmits a plurality of pieces of recording destination information and content data. The recording control unit records, when the recording destination is a recording medium, the content data and the recording destination information in the first recording unit, and records the content data on the recording medium based on the recording destination information.

8 Claims, 7 Drawing Sheets

(56) References Cited

FOREIGN PATENT DOCUMENTS

| | | |
|---|---|---|
| JP | 2006031394 A | 2/2006 |
| JP | 2006323890 A | 11/2006 |
| JP | 2007-019779 | 1/2007 |
| JP | 2007013563 A | 1/2007 |
| JP | 2007193899 A | 8/2007 |
| JP | 2007199890 A | 8/2007 |
| JP | 2007310988 A | 11/2007 |
| JP | 2007323699 A | 12/2007 |
| JP | 2008262304 A | 10/2008 |
| WO | 0013412 A1 | 3/2000 |

OTHER PUBLICATIONS

Office Action from Japanese Application No. 2008-110747, dated Dec. 21, 2010.

Office Action from Japanese Application No. 2008-110747, dated Mar. 2, 2010.

* cited by examiner

| TRANSMITTED CONTENT | TRANSMISSION METHOD | | RECORDING DESTINATION | | | |
| --- | --- | --- | --- | --- | --- | --- |
| TITLE 1 | COPY | MOVE | HDD | BD | DVD | MEMORY CARD |
| TITLE 2 | COPY | MOVE | HDD | BD | DVD | MEMORY CARD |
| TITLE 3 | COPY | MOVE | HDD | BD | DVD | MEMORY CARD |

RECORDING SYSTEM, TRANSMISSION APPARATUS, RECORDING APPARATUS, RECORDING CONTROL METHOD, AND RECORDING MEDIUM

The present application claims priority from Japanese Patent Application No. JP 2008-110747, filed in the Japanese Patent Office on Apr. 21, 2008, the entire content of which is incorporated herein by reference.

BACKGROUND OF THE INVENTION

1. Field of the Invention

The present invention relates to a recording system, a transmission apparatus, a recording apparatus, a recording control method, and a recording medium storing a program for recording content data transmitted from a transmission source on a transmission-destination side.

2. Description of the Related Art

With the widespread use of a data communication network, the use of a so-called home network for realizing communication between devices via a network of electric appliances, computers, and peripherals is increasing at home. Data processing functions of connected devices are shared by communication via a home network and content is exchanged between the devices via the home network, whereby convenience and comfortable use is provided to users.

For example, a utilization form for recording content stored in a content providing server in another device connected via a home network of various home electronic devices is available. For example, software data (hereinafter, referred to as content), such as audio data such as music data, image data such as movies, game programs, and various application programs, can be stored, as digital data, on recording media, e.g., a digital versatile disc (DVD), a mini disc (MD), and a compact disc (CD). In addition, a Blu-ray Disc® (hereinafter, referred to as a BD) for realizing high-density recording with the blue laser is put on the market. Digital content is stored on these various information recording media (recording media).

Figure 7:
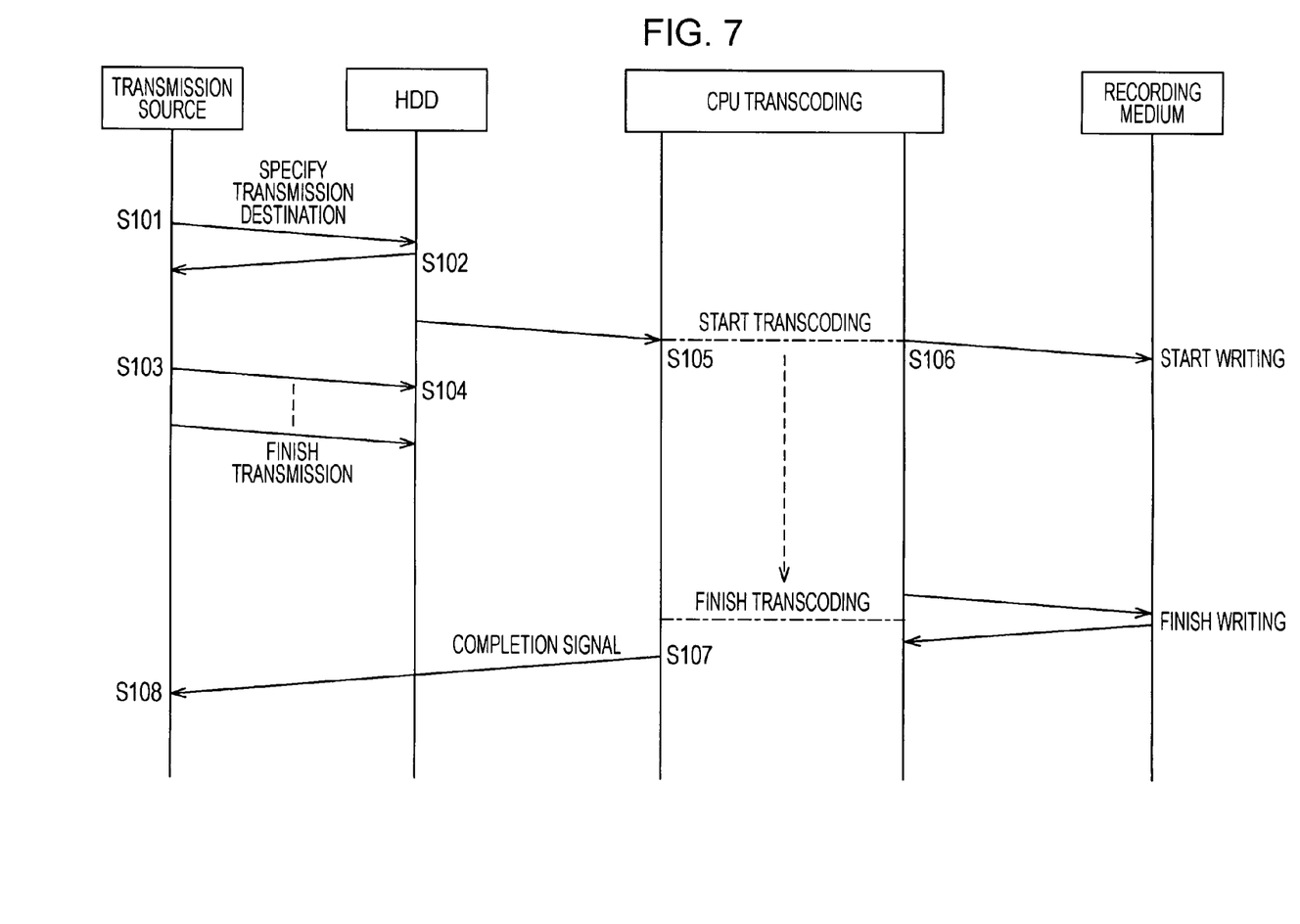
FIG. 7 is a diagram showing processing for recording content data transferred from a transmission source on transmission-destination side.

FIG. 7 is a diagram showing processing for recording content data transmitted from a transmission source on a transmission-destination side. For example, the transmission source may be a set top box (STB), referred to as a personal video recorder (PVR), having a function for recording broadcasted videos in a hard disk drive (HDD). The transmission destination may be, for example, a recorder having an HDD and a BD drive.

A method for "copying" content stored in a source device (transmission source) in a synchronization device (transmission destination) and a method for "moving" the content from the source device to the synchronization device so that the content is not left in the source device are available as content transmission methods.

A procedure of a case of accurately executing the "move" operation between two devices, namely, the source device and the synchronization device, will be described below.

At STEP S101, the source device specifies a recording destination medium of the synchronization device. In this example, the source device specifies a BD as the recording destination medium.

At STEP S102, the synchronization device confirms that the BD is inserted thereto before returning a status indicating "ready" to the source device.

At STEP S103, the source device confirms that the synchronization device is "ready" and starts transmitting content.

At STEP S104, the synchronization device records the content transmitted from the source device in the HDD. The synchronization device temporarily records the content in the HDD since the recording speed of the HDD is higher than that of the BD. For example, if 1-hour content of 6750 Mbytes encoded at 15 Mbps is recorded at a speed of 30 Mbps, transfer of the content to the HDD is finished in 540 seconds (here, it is assumed that the maximum transfer speed between the devices is equal to 100 Mbps although the recording speed of the HDD is higher than 100 Mbps).

15 (Mbps)×3600 (seconds)/8=6750 (Mbytes)

6750 (Mbytes)×8/100 (Mbps)=540 (seconds)

Since the source device has finished executing actual processing, a user can use the source device for a different purpose. However, deletion of the moved content from the source device is not allowed until the source device recognizes termination of the recording processing executed in the synchronization device.

At STEP S105, the synchronization device executes transcoding at the time of recording of the content from the HDD to the BD to make the format of the content compliant with the format of the BD.

At STEP S106, the synchronization device records the transcoded content data on the BD. Since the speed of transcoding and the recording speed of the BD are low, it takes, for example, 1800 seconds to finish transferring the content to the BD.

At STEP S107, the synchronization device transmits a completion signal to the source device after confirming completion of transferring of 100% of the content to the BD.

At STEP S108, the source device recognizes that transfer of the content is successfully completed by receiving the completion signal from the synchronization device and deletes the content from the source device.

After the termination of the move operation, the user can operate the source device. However, the user is kept waiting for 1800 seconds (30 minutes) until termination of writing of the content on the BD although it takes 540 seconds (9 minutes) to finish transferring the content.

Japanese Unexamined Patent Application Publication No. 2001-125833 discloses an example of a recording apparatus.

SUMMARY OF THE INVENTION

As described above, when content in a different format is recorded on a recording medium compliant with a standard format, processing, such as transcoding, is performed on a recording-device side. In such a case, a synchronization device on a transmission-destination side generally records the content in an HDD serving as an intermediate buffer to increase the transfer speed between the devices on the transmission-source side and the transmission-destination side and to execute transcoding processing.

However, since a completion signal is not output to the source device on the transmission-source side until completion of recording of content data on a recording medium, the source device is not ready to execute other kinds of processing during this period, which is significantly inefficient.

In addition, when an available space of a recording medium of the synchronization device on the transmission-destination side is insufficient or when the content data is recorded on another recording medium, an exchange of the recording media prevents the content data to be continuously received.

In view of such a circumstance, embodiments of the present invention provide a recording system, a transmission apparatus, a recording apparatus, a recording control method, and a program for efficiently recording content data transmitted from a transmission source on a transmission-designation side.

According to an embodiment of the present invention, a recording system includes a transmission apparatus having a storage unit configured to store content data, a generating unit configured to generate recording destination information specifying a recording destination of the content data, and a transmission control unit configured to transmit the recording destination information and the content data, and a recording apparatus having a first recording unit configured to record content data, a second recording unit configured to record content data on a recording medium at a recording speed lower than that of the first recording unit, and a recording control unit configured to receive the recording destination information from the transmission apparatus and control the first recording unit and the second recording unit on the basis of the recording destination information. The transmission control unit continuously transmits a plurality of pieces of recording destination information each specifying a recording destination and a plurality of pieces of content data to the recording apparatus. The recording control unit records, when the recording destination specified by the recording destination information is a recording medium, the content data and the recording destination information in the first recording unit, and records the content data on the recording medium on the basis of the recording destination information recorded in the first recording unit.

According to another embodiment of the present invention, a transmission apparatus includes a storage unit configured to store content data, a generating unit configured to generate recording destination information specifying a recording destination of the content data, and a transmission control unit configured to transmit the recording destination information and the content data. The transmission control unit continuously transmits a plurality of pieces of recording destination information and a plurality of pieces of content data to a transmission destination.

According to still another embodiment of the present invention, a recording apparatus includes a first recording unit configured to record content data, a second recording unit configured to record content data on a recording medium at a recording speed lower than that of the first recording unit, and a control unit configured to receive recording destination information specifying a recording destination of the content data from a transmission source and control the first recording unit and the second recording unit on the basis of the recording destination information. The control unit records, when the recording destination specified by the recording destination information is a recording medium, the content data and the recording destination information in the first recording unit, and records the content data on the recording medium on the basis of the recording destination information recorded in the first recording unit.

According to a further embodiment of the present invention, a recording control method includes the steps of continuously receiving a plurality of pieces of recording destination information each specifying a recording destination and a plurality of pieces of content data from a transmission apparatus, recording the plurality of pieces of continuously received content data and the plurality of pieces of continuously received recording destination information in a recording unit, and recording, when the recording destination specified by the recording destination information is a recording medium, the content data on the recording medium on the basis of the recording destination information recorded in the recording unit.

According to a still further embodiment of the present invention, a recording medium storing a program causes a computer to execute a method including the steps of continuously receiving a plurality of pieces of recording destination information each specifying a recording destination and a plurality of pieces of content data from a transmission apparatus, recording the plurality of pieces of continuously received content data and the plurality of pieces of continuously received recording destination information in a recording unit, and recording, when the recording destination specified by the recording destination information is a recording medium, the content data on the recording medium on the basis of the recording destination information recorded in the recording unit.

According to the embodiments of the present invention, recording destination information and content data are recorded in a first recording unit having a higher recording speed and the content data is then recorded on a recording medium on the basis of the recording destination information, whereby the content data can be efficiently recorded on the recording medium and a plurality of pieces of content data can be continuously received from a transmission source.

DESCRIPTION OF THE PREFERRED EMBODIMENTS

Specific embodiments of the present invention will be described in detail below with reference to the accompanying drawings. A recording system according to an embodiment of the present invention includes a transmission apparatus on a transmission-source side and a recording apparatus on a transmission-destination side. When recording destination information, which is continuously transmitted with a plurality of pieces of content data from the transmission apparatus to the recording apparatus, specifies a recording medium, such as a digital versatile disc (DVD) and a Blu-ray Disc®, as a recording destination, the recording apparatus records the content data on the recording medium after temporarily recording the content data and the recording destination information on a storage unit, such as a hard disk drive (HDD).

For example, a set top box (STB), referred to as a personal video recorder (PVR), having a function for recording broadcasted videos in a hard disk drive (HDD) and a recorder having an HDD drive and a BD drive, or a STB and a personal computer (PC), or a server and a PC may be used as a source device on the transmission-source side and a synchronization device on the transmission-destination side, respectively.

An STB and a recorder will be described below as an example of a configuration of a recording system according to an embodiment of the present invention.

Figure 1:
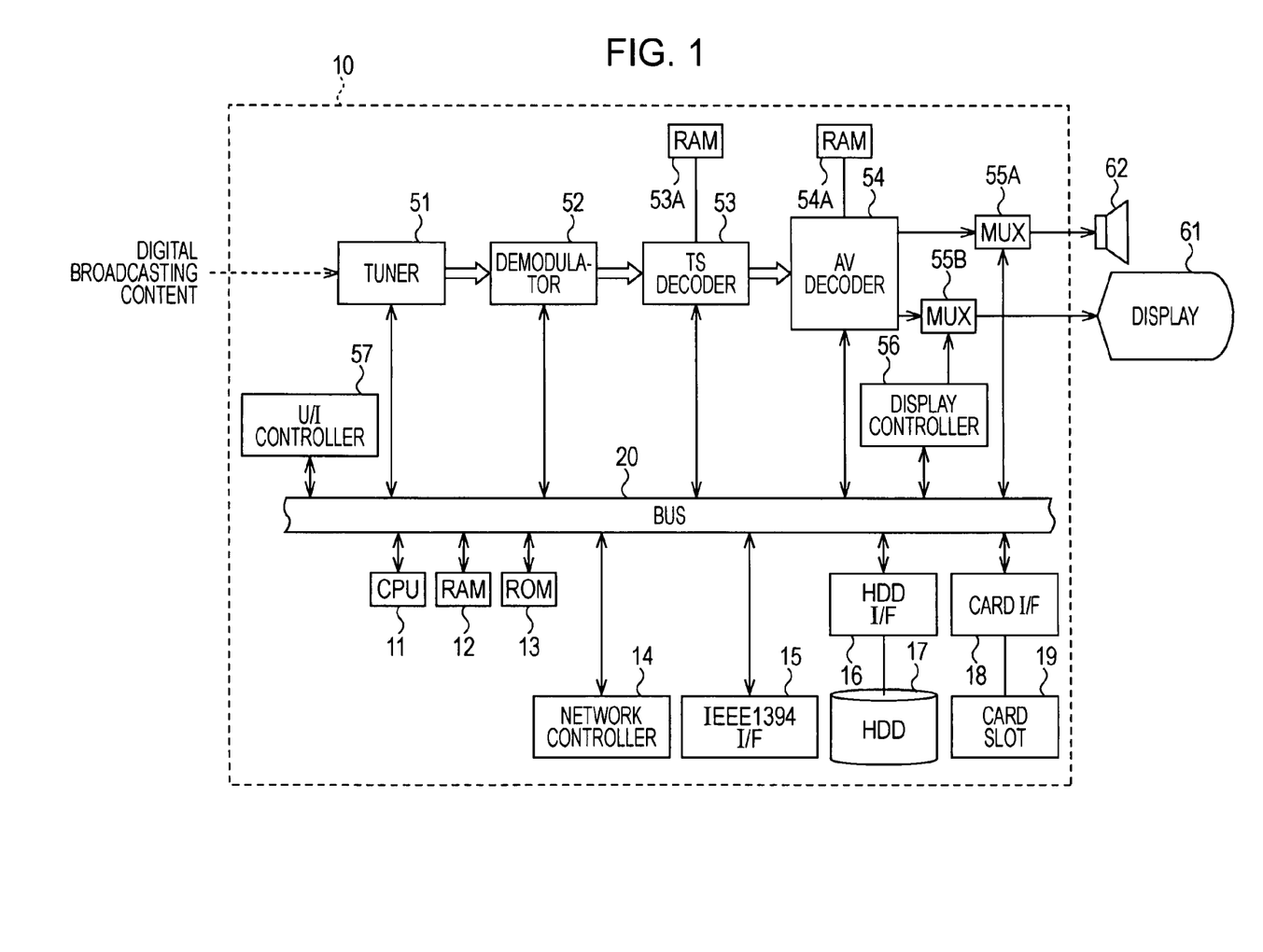
FIG. 1 is a diagram showing an example of a configuration of a receiver.

FIG. 1 is a diagram showing an example of a configuration of a receiver 10 for receiving digital broadcasting content. The receiver 10 is widely used at home as a so-called STB, for example.

A central processing unit (CPU) 11 serves as a main controller to collectively control components connected to each other through a bus 20. Each component will be described below.

The CPU 11 is a main controller for controlling operations of the receiver 10. For example, the CPU 11 processes station selection control information and program information that are transmitted thereto through the bus 20. More specifically, the CPU 11 controls, on the basis of contents of a digital copy control descriptor for describing information regarding copyright protection of the digital broadcasting content and a content utilization descriptor, processing for outputting the received broadcasting content realtime, processing for outputting the reproduced broadcasting content, and processing for scheduled recording of the received broadcasting content to protect the copyright of the content. The CPU 11 also copies or moves content recorded in an HDD 17 in accordance with, for example, a copy restriction defined by a digital copy control descriptor that is multiplexed in a transport stream. In addition, the CPU 11 generates recording destination information that indicates a copy destination or a move destination as described below.

A random access memory (RAM) 12 may be a writable volatile memory that is used for loading program codes to be executed by the CPU 11 and for writing work data of the executed program codes.

A read only memory (ROM) 13 is a read only memory for permanently storing a self-diagnostic program and/or an initialization program to be executed at the time of power-on of the receiver 10 and micro codes for operations of hardware.

A network controller 14 is a communication controller for realizing communication between the receiver 10 and an external device via a network.

Institute of electrical and electronics engineers (IEEE) 1394 interface (I/F) 15 is a high-speed serial interface capable of realizing transmission/reception of data of several hundreds Mbps. IEEE 1394-compliant external devices connected in a daisy chain form or a tree form can be connected to the IEEE 1394 port.

In this embodiment, for example, universal plug and play (UPnP) can be used as a specification for connecting devices, such as home PCs and peripheral devices, via a network and providing functions to each other. The UPnP is used by the network controller 14 or the IEEE 1394 interface 15.

The UPnP is a specification in view of utilization of the transmission control protocol/internet protocol (TCP/IP). The UPnP is based on three protocols, namely, the auto IP, the multicast DNS, and the simple service discover protocol (SSDP). The UPnP is a combination of the IP technology that is an Internet standard technology and the XML.

In UPnP content transmission, devices are categorized into a media server for providing content data and a control point functioning as a control terminal device. The media server corresponds to a so-called server of a network system. In this embodiment, the media server corresponds to the receiver 10.

The HDD 17 is an external storage device for storing programs and data in a predetermined file format. The HDD 17 has a relatively large capacity of several hundreds gigabytes. The HDD 17 is connected to the bus 20 through an HDD interface 16. In this embodiment, the HDD 17 is utilized to store received broadcasting content. The content recorded in the HDD 17 is appropriately read out, reproduced, copied, or moved under control of the CPU 11.

A card interface 18 realizes a bus protocol between a card device, such as a PC card inserted into a card slot 19, and the bus 20.

A broadcasting receiving function will now be described. Broadcast waves of digital broadcasting content received by an antenna are supplied to a tuner 51. The broadcast waves are not limited particularly and may be cable broadcast waves or terrestrial broadcast waves.

A tuner 51 performs turning of a broadcast wave of a predetermined channel (channel selection) in accordance with an instruction issued from the CPU 11 and outputs received data to a demodulator 52 at a subsequent stage. The demodulator 52 demodulates the digitally modulated received data.

The demodulated digital data may be, for example, a transport stream resulting from multiplexing of AV data compressed according to the MPEG2 standard and program information. The AV data includes video and audio information constituting a broadcasted program and subtitle data. The program information is a data accompanying this broadcasted program. The program information is written in a section format, such as PSI and SI, and is used in an electronic program guide and a scheduled recording of a program.

A TS decoder 53 interprets the transport stream, divides the transport stream into the AV data compressed according to the MPEG2 standard and the program information, and outputs the AV data and the program information to an AV decoder 54 and the CPU 11 through the bus 20, respectively. The TS decoder 53 may include a work data storage memory (RAM) 53A therein.

Upon receiving the realtime AV data compressed according to the MPEG2 standard from the TS decoder 53, the AV decoder 54 divides the AV data into compressed video data and compressed audio data. The AV decoder 54 decompresses the video data according to the MPEG2 standard to reproduce an original video signal. The AV decoder 54 decodes the audio data according to the pulse code modulation (PCM) and combines the decoded audio data with additional sounds to reproduce an audio signal. The AV decoder 54 may include a work data storage memory (RAM) 54A therein. The reproduced video signal is output to and displayed on a display 61 through a multiplexer (MUX) 55B. The reproduced audio signal is output to a speaker 62 through a multiplexer (MUX) 55A. Alternatively, the compressed video data and the compressed audio data may be transferred to and temporarily stored in the HDD 17 through the bus 20 without decompression and may be decompressed by the AV decoder 54 thereafter to be reproduced and output.

A display controller 56 is a dedicated controller for controlling display of broadcasting program information on the basis of content of data broadcasting.

A user interface (U/I) controller 57 is a module for processing user input operations. The U/I controller 57 has, for example, operation buttons/switches used by a user to perform direct manual operations and a function for receiving a remote operation from a remote control using infrared (IR) or the like.

The receiver 10 performs, for example, an operation for scheduled recording in accordance with a command input by a user through the U/I controller 57 and stores content in the HDD 17. The receiver 10 also transmits the content stored in the HDD 17 to another device, such as a recording device, through the network controller 14 or the IEEE 1394 interface 15 in a manner described below.

Figure 2:
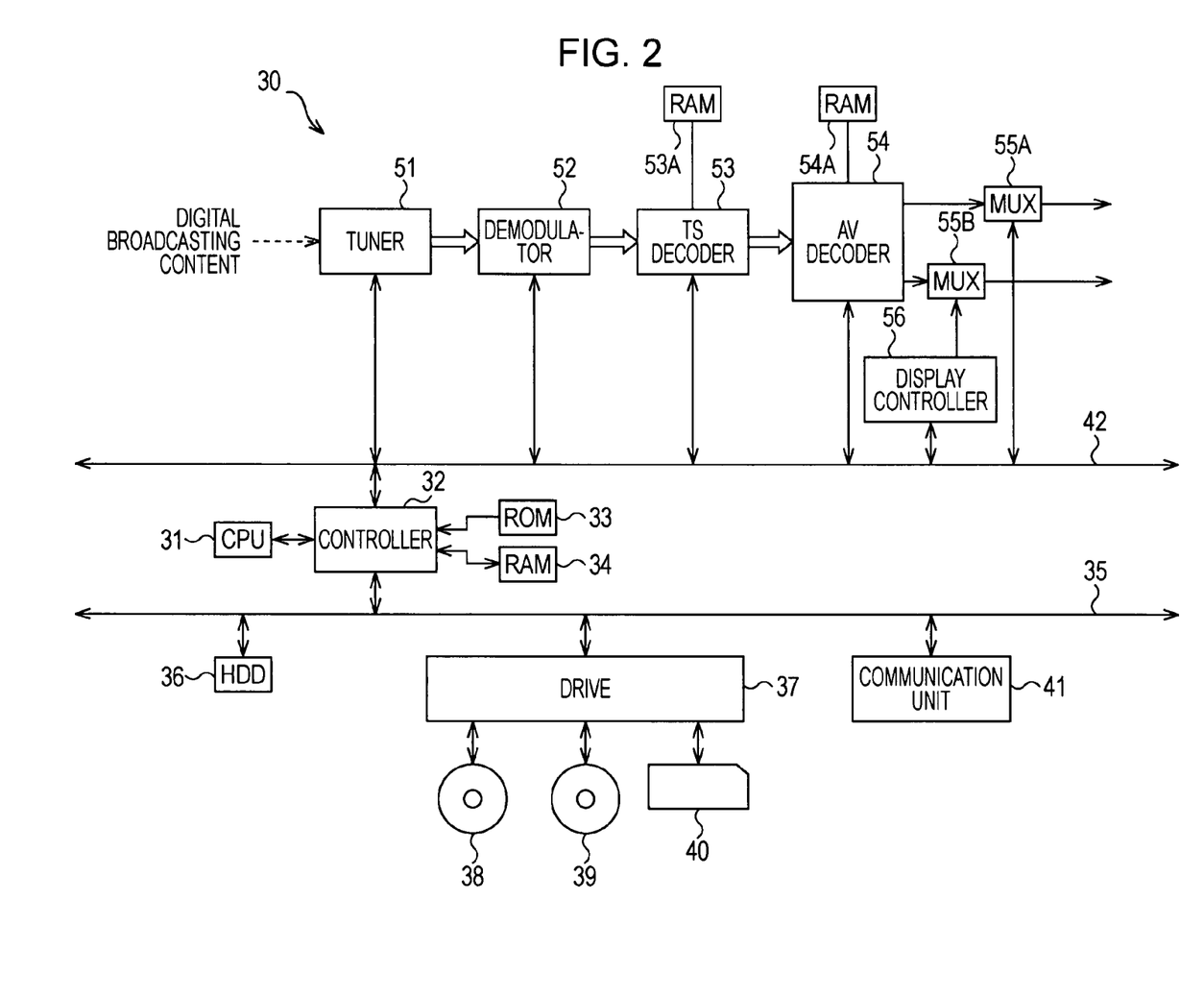
FIG. 2 is a block diagram showing an example of a configuration of a recording apparatus.

FIG. 2 is a block diagram showing an example of a configuration of a recording apparatus 30. The recording apparatus 30 is widely used at home as a recorder, for example.

A central processing unit (CPU) 31 executes programs stored in a read only memory (ROM) 33 and programs loaded into a random access memory (RAM) 34 from a hard disk drive (HDD) 36 through a controller 32 to control operations of components connected to buses 35 and 42.

The HDD 36 stores content supplied thereto through the bus 35. The HDD 36 also serves as an intermediate buffer to store content and recording destination information under control of the CPU 31 at the time of recording of the content on a recording medium.

A drive 37 drives inserted optical discs, such as a digital versatile disc (DVD) 38 and a Blu-ray Disc® (BD) 39. The drive 37 also drives a memory card 40 inserted into a slot formed in a casing of the recording apparatus 30. With such a configuration, the drive 37 records data supplied through the bus 35 on these recording media. The drive 37 also reads out data recorded on these recording media and outputs the data to the bus 35. For example, when copying of content recorded in the HDD 36 to the DVD 38 is instructed, the drive 37 records the content supplied from the HDD 36 through the bus 35 on the DVD 38. More specifically, the CPU 31 executes transcoding to make the format of the content compliant with the format of the DVD 38 or the BD 39 before recording the content on the recording medium.

A communication unit 41 communicates with external devices connected thereto through, for example, an institute of electrical and electronics engineers (IEEE) 1394 cable and receives content from the external devices through the bus 35.

The CPU 31 controls a tuner 51, a demodulator 52, a TS decoder 53, an AV decoder 54, multiplexers (MUX) 55A and 55B, and a display controller 56 through the controller 32 and the bus 42 to realize a broadcasting receiving function. Since the broadcasting receiving function of the recording apparatus 30 is the same as that of the receiver 10, a description thereof is omitted here.

Transmission of content between the above-described receiver 10 and the recording apparatus 30 will now be described.

Figure 3:
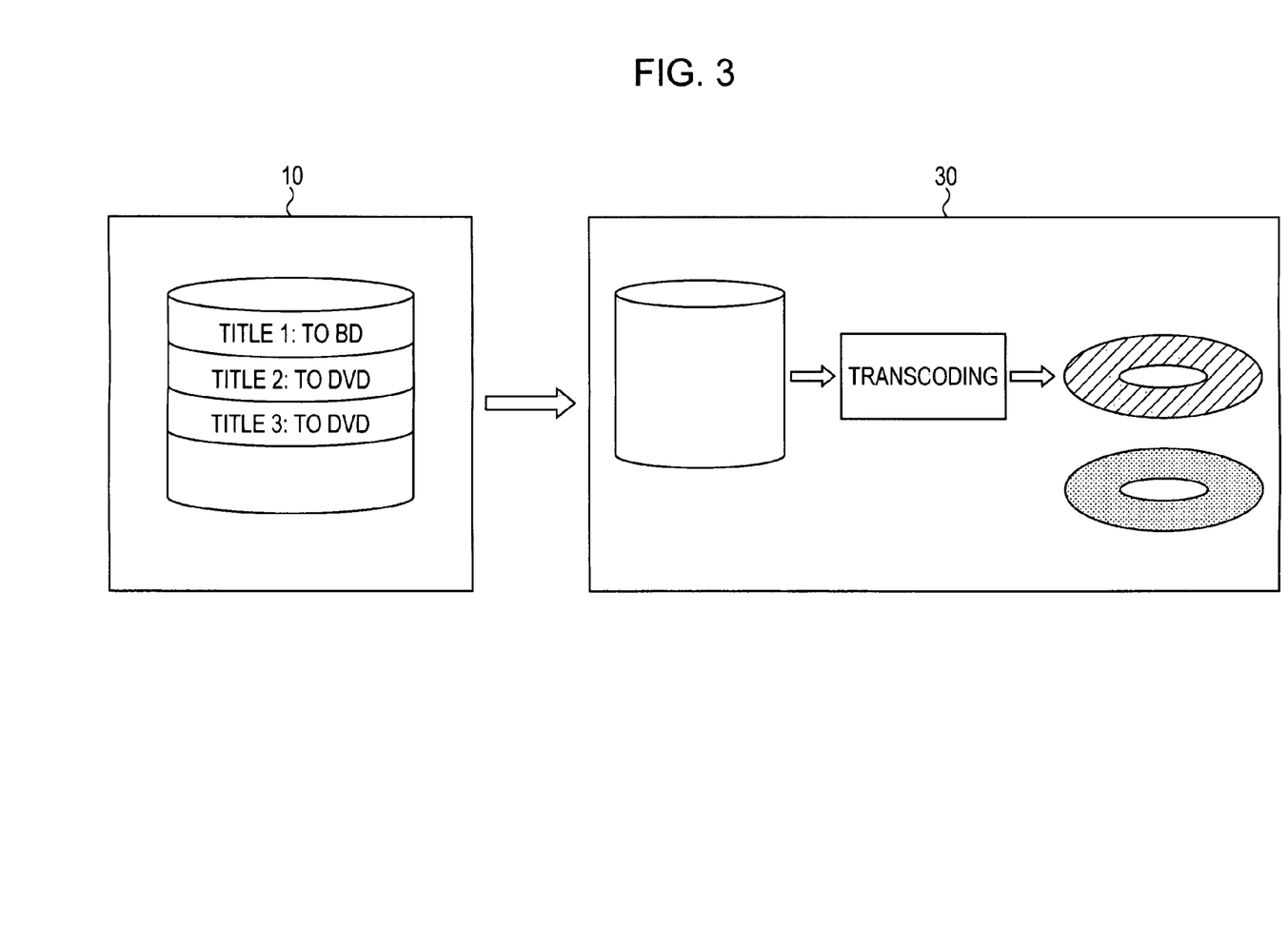
FIG. 3 is a diagram schematically showing an example of transmission of content.

FIG. 3 is a diagram schematically showing an example of transmission of content. A method for "copying" content stored in a source device (transmission source) in a synchronization device (transmission destination) and a method for "moving" the content from the source device to the synchronization device so that the content is not left in the source device are available as content transmission methods. In this transmission example, titles 1, 2, and 3 are moved to the BD 39, the DVD 38, and the DVD 38, respectively.

Figure 4:
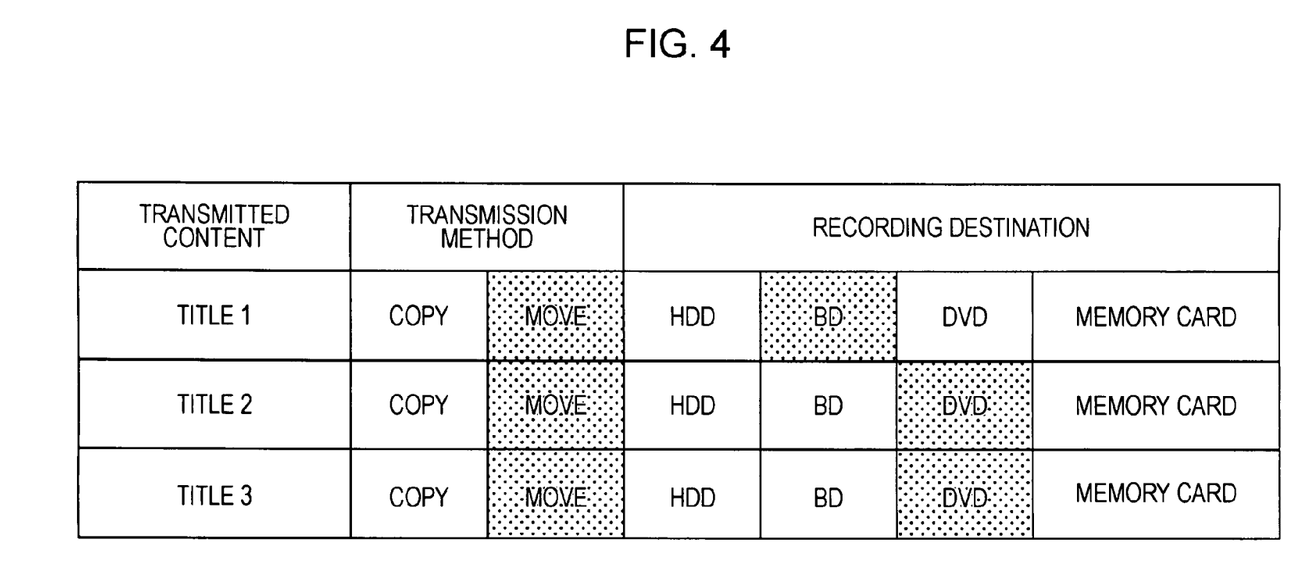
FIG. 4 is a diagram schematically showing specification of a recording destination in a receiver.

FIG. 4 is a diagram schematically showing specification of a recording destination performed in the receiver 10 on a transmission-source side. The receiver 10 receives an input operation from a user through the U/I controller 57 to allow the user to select content to be transmitted, a transmission method, and a recording destination. On the basis of the input operation, recording destination information is generated.

The CPU 11 restricts transmission methods of content recorded in the HDD 17 in accordance with a copy restriction defined by, for example, a digital copy control descriptor. For example, in the case of content for which only "move" is permitted by the copy restriction, the CPU 11 displays only "move" in a selectable manner. The CPU 11 also acquires recordable medium type information from the recording apparatus 30 in a manner described below and displays only types of recordable media in a selectable manner. In this manner, a user can certainly perform transmission without checking a copy restriction applied to content and recording medium types supported by the recording apparatus 30.

Figure 5:
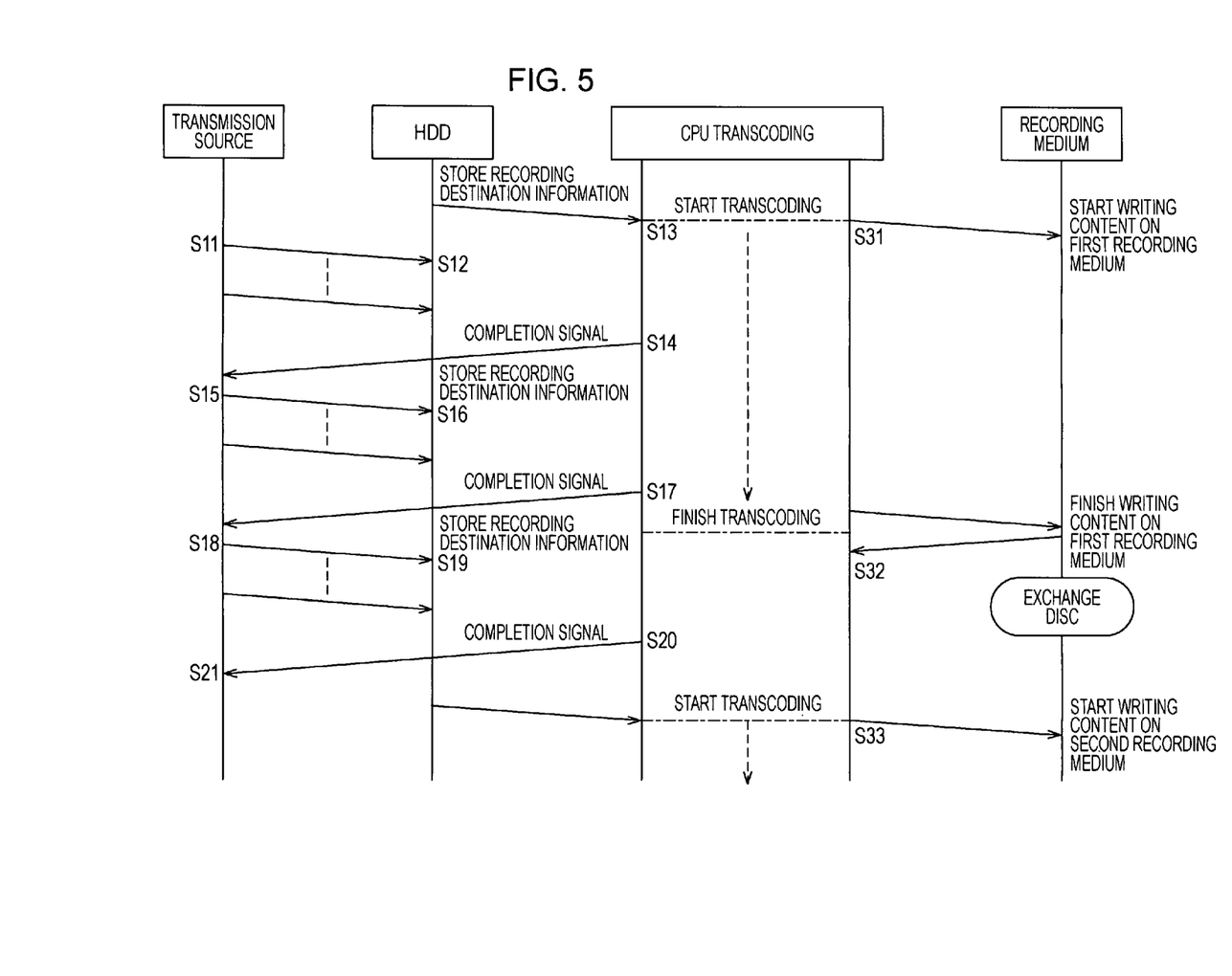
FIG. 5 is a diagram showing processing for recording content data to be recorded on a plurality of recording destinations on a transmission-destination side.

FIG. 5 is a diagram showing processing for recording content data to be recorded on a plurality of recording destinations on a transmission-destination side. In this example, recording destination information specifies that titles 1, 2, and 3 are moved to the BD 39, the DVD 38, and the DVD 38, respectively, as shown in FIGS. 3 and 4.

At STEP S11, the receiver 10 transmits content of the title 1 to the recording apparatus 30 along with the recording destination information specifying that the title 1 is moved to the BD 39.

At STEP S12, the CPU 31 of the recording apparatus 30 stores the recording destination information transmitted from the receiver 10 in the HDD 36 and records the content of the title 1 in the HDD 36. In this manner, time for inserting a recording medium into the recording apparatus 30 to start the transmission can be omitted unlike the related art.

At STEP S13, the CPU 31 starts transcoding the content of the title 1 on the basis of the recording destination information stored in the HDD 36. Here, the CPU 31 transcodes the content into a format of the BD.

At STEP S14, upon detecting completion of recording of the content of the title 1 in the HDD 36, the CPU 31 transmits a completion signal to the receiver 10.

At STEP S15, upon receiving the completion signal, the receiver 10 sets a deletion flag indicating deletion of the content of the title 1 from the HDD 17. The receiver 10 also transmits content of the title 2 to the recording apparatus 30 along with the recording destination information.

At STEP S16, as in the case of the content of the title 1, the CPU 31 stores the recording destination information transmitted from the receiver 10 in the HDD 36 and records the content of the title 2 in the HDD 36.

At STEP S17, upon detecting completion of recording of the content of the title 2 in the HDD 36, the CPU 31 transmits a completion signal to the receiver 10.

At STEP S18, upon receiving the completion signal, the receiver 10 sets a deletion flag indicating deletion of the content of the title 2 from the HDD 17. The receiver 10 also transmits content of the title 3 to the recording apparatus 30 along with the recording destination information.

At STEP S19, as in case of the content of the title 1, the CPU 31 stores the recording destination information transmitted from the receiver 10 in the HDD 36 and records the content of the title 3 in the HDD 36.

At STEP S20, upon detecting completion of recording of the content of the title 3 in the HDD 36, the CPU 31 transmits a completion signal to the receiver 10.

At STEP S21, upon receiving the completion signal, the receiver 10 sets a deletion flag indicating deletion of the content of the title 3 from the HDD 17.

The CPU 11 of the receiver 10 deletes the titles 1-3 in accordance with the deletion flags. The receiver 10 may delete the titles 1-3 after completion of transmission of all of the titles 1-3 or after reception of each completion signal.

At STEP S13, the CPU 31 starts transcoding the content of the title 1 on the basis of the recording destination information stored in the HDD 36. The CPU 31 then starts writing the content data of the title 1 on the BD 39 at STEP S31.

At STEP S32, upon detecting termination of transcoding of the content data of the title 1 and termination of writing of the content data of the title 1 on a first recording medium, namely, the BD 39, the CPU 31 reads out the recording destination information of the title 2 stored in the HDD 36. The CPU 31 then displays a message prompting a user to exchange a disc on the basis of the recording destination information of the title 2 and waits for insertion of a second recording medium.

At STEP S33, upon detecting insertion of the DVD 38 specified by the recording destination information of the title 2, the CPU 31 starts transcoding the content of the title 2 and starts writing the content data of the title 2 on the DVD 38.

In this manner, the source device continuously transmits a plurality of pieces of content. After completion of the transmission, the source device is ready to perform another kind of processing. Accordingly, a user can comfortably operate the source device without waiting for completion of recording of the content in the synchronization device (recording apparatus 30) unlike the related art.

By storing the recording destination information, the recording apparatus 30 can record the content on specified recording media on the basis of the recording destination information after completion of transmission of the content from the source device even if recording-destination media of the first and second content differ.

An example of transmission of content according to the universal plug and play (UPnP) will now be described. In the UPnP, devices are categorized into a media server for providing content data and a control point functioning as a control terminal apparatus. Here, the media server corresponds to a so-called server of a network system. For example, the media server corresponds to the receiver 10 shown in FIG. 1.

The control point (control device) can control each UPnP device connected to a network. Functions of the control point may be included in the media server. The functions of the control point may be included in all of devices constituting the network or may be included in given devices constituting the network. In this example, the functions of the control point are included in the receiver 10.

The functions of the control point are mainly categorized into two kinds, namely, an action and a query. The action is executed in a method defined by action information of a service description. By executing the action, the control point can operate a target. The query is used to extract values of device information of the service description. A transport protocol called SOAP is utilized in execution of the action or the query. The XML is used to represent the SOAP.

The media server has a function called a contents directory service (CDS). The media server notifies the control point of kinds of content stored in the media server. The CDS has two abstracted objects, namely, a container and an item. The container and the item correspond to a folder and a file of Windows®, respectively, which is an operating system provided by Microsoft corporation.

Figure 6:
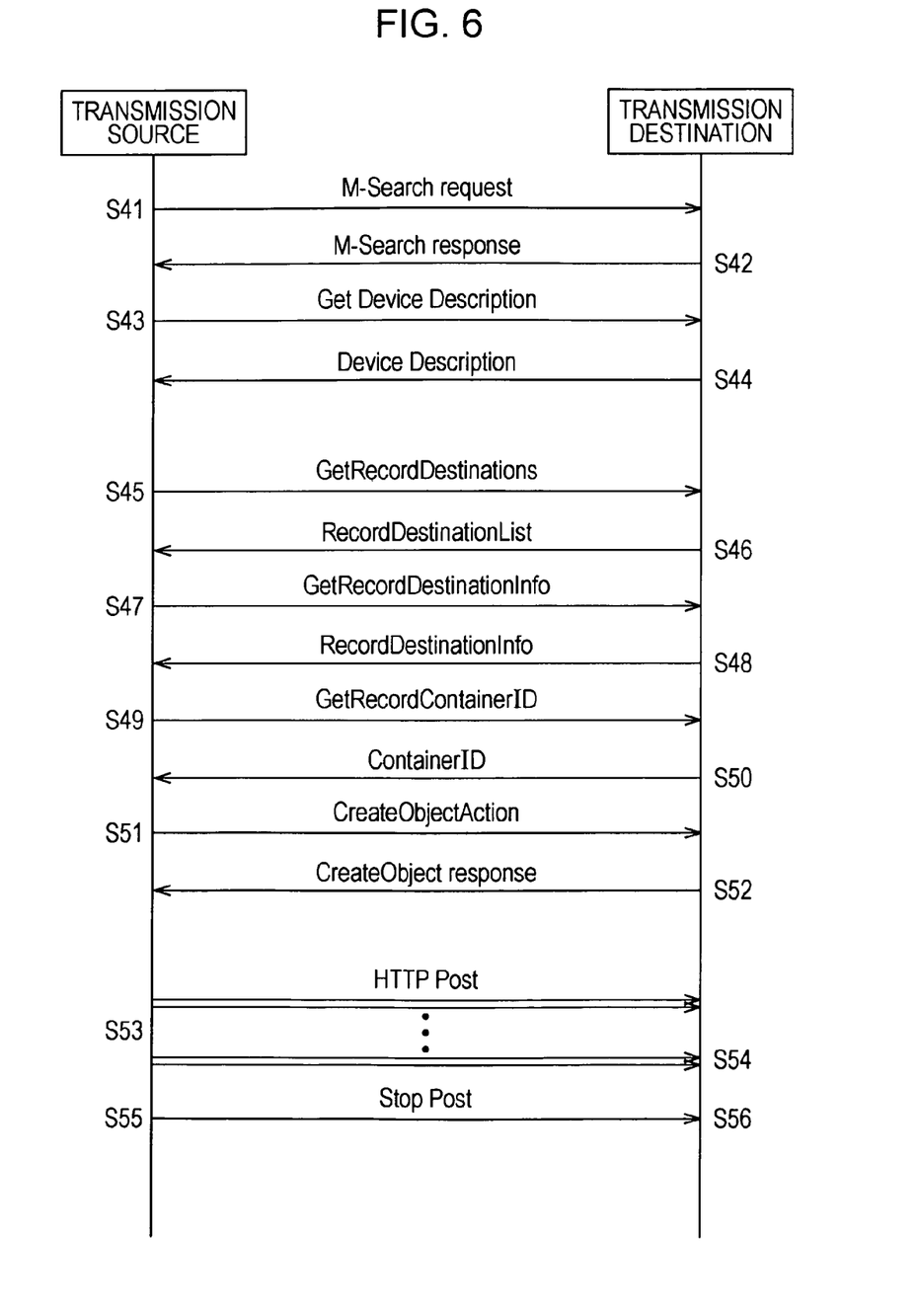
FIG. 6 is a diagram showing an example of content transmission processing.

FIG. 6 is a diagram showing an example of content transmission processing. Processing for transmitting content from the receiver 10 serving as a control point to the recording apparatus 30 will be described.

At STEP S41, the receiver 10 on the transmission-source side inquires about devices connected to a network ("M-Search request").

At STEP S42, the recording apparatus 30 on the transmission-destination side responds to the inquiry of the receiver 10 ("M-Search response").

At STEP S43, the receiver 10 inquires at the recording apparatus 30 about device information called a "device description" ("Get Device Description").

At STEP S44, in response to the inquiry about the device information from the receiver 10, the recording apparatus 30 transmits a "device description document" in an XML format indicating the device information to the receiver 10.

<hdlnk:X_HDLNKDOC xmlns:hdlnk="device-1-0">
REC-1.00
</hdlnk:X_HDLNKDOC>

The receiver 10 can know a list of actions of the recording device 30 that the receiver 10 can control by acquiring this XML document.

At STEP S45, the receiver 10 inquires about recording device information, such as a destination ID or a friendly name of a drive ("GetRecordDestinations").

At STEP S46, the recording apparatus 30 transmits the recording device information, such as an HDD, a BD, a DVD, and a memory card, to the receiver 10 ("RecordDestinationList").

At STEP S47, the receiver 10 inquires about detailed information, such as information indicating whether the drive is ready for writing and information on an available space of the drive ("GetRecordDestinationInfo").

At STEP S48, the recording apparatus 30 transmits the detailed information, such as a state of the drive, to the receiver 10 ("RecordDestinationInfo"). For example, if the recording apparatus 30 has a function for recording content on a DVD+RW and a DVD-R and the DVD+RW is currently inserted into the recording device 30, the recording apparatus 30 transmits the following detailed information.

Recordable medium types: allowedTypes=BD, DVD+RW, DVD-R

Currently inserted recording medium: currentMeiaType=DVD+RW

Here, the recording apparatus 30 returns a variable, such as, for example, "currentMediaType=all". In this manner, the receiver 10 recognizes that the recording apparatus 30 has a function for storing the recording destination information and can specify a plurality of different recording destination media in "CreateObjectAction" or the like.

At STEP S49, the receiver 10 inquires at the recording apparatus 30 about a container ID of the drive and a logical storage position of the content ("GetRecordContainerID").

At STEP S50, the recording apparatus 30 returns the container ID of the drive and the logical storage position of the content.

At STEP S51, the receiver 10 executes an action "CreateObject". In this manner, the recording destination information written in the XML is transmitted to the recording apparatus 30 ("CreateobjectAction").

At STEP S52, the recording apparatus 30 receives "CreateObjectAction" and returns a uniform resource locator (URL) indicating a storage area of the recording destination that stores the content data to the receiver 10 ("CreateObject response").

At STEP S53, the receiver 10 executes http-post processing defined by the UPnP to transmit the content data to the URL received from the recording apparatus 30.

At STEP S54, the recording apparatus 30 receives the content data and the recording destination information transmitted from the receiver 10. When the recording destination information indicates a recording medium, such as the DVD 38 or the BD 39, the recording apparatus 30 records the content data and the recording destination information in the HDD 36.

At STEP S55, after completion of transmission of content of one title, the receiver 10 notifies the recording apparatus 30 of the termination of the transmission of the content ("StopPost").

At STEP S56, upon receiving the "StopPost", the recording apparatus 30 transmits a completion signal to the receiver 10. In the case of copying, transmission of the completion signal may be omitted.

In such a protocol, content is uploaded to the recording apparatus 30 from the receiver 10 (control point). In particular, at STEP S48, the recording apparatus 30 returns a variable of "currentMediaType=all", whereby the receiver 10 can recognize that the recording apparatus 30 has a function for storing the recording destination information. Accordingly, the receiver 10 can specify a plurality of recording medium types in "CreateObjectAction" or the like.

The source device generally checks an inserted medium before transmission in the related art. However, according to the embodiment, the recording apparatus 30 stores a plurality of pieces of recording destination information in association with the plurality of pieces of content, whereby transmission of a plurality of pieces of content can be performed at a high speed. In addition, the recording medium can be ejected during the processing and shortage of an available space can be coped with.

The recording apparatus 30 outputs a completion signal in response to completion of recording of each content in the HDD 36, whereby the receiver 10 can start transmission of the next content without waiting for completion of writing of the content on a recording medium when a plurality of pieces of content are recorded on different types of recording media.

In addition, since the receiver 10 can transmit a plurality of pieces of content in a short period, the receiver 10 can start a next operation rapidly, which is significantly convenient to users.

Although the embodiments have been described above, the present invention is not limited to the above-described embodiments and can be variously modified on the basis of the technical concept of the present invention.

For example, when the above-described series of processing steps is executed by software, programs constituting the software are installed in a computer built in dedicated hardware from a network or a recording medium. Alternatively, the programs are installed in, for example, a general-purpose personal computer capable of executing various functions by installing various programs.

The recording medium storing such programs is distributed separately from an apparatus to provide the programs to users. For example, the recording medium may be a removable recording medium (package medium), such as a magnetic disk (including a floppy disk), an optical disc (including a compact disc-read only memory (CD-ROM) and a digital versatile disc (DVD)), a magneto-optical disk (including a mini disc (MD)), and a semiconductor memory that store the programs. In addition, the programs may be preinstalled in the apparatus and provided to users. A ROM and an HDD storing the programs may be provided.

In this specification, the steps described in the program constituting the software include processing that is executed sequentially in the described order, and also includes processing that is executed in parallel or individually, not necessarily sequentially.

It should be understood by those skilled in the art that various modifications, combinations, sub-combinations and alterations may occur depending on design requirements and other factors insofar as they are within the scope of the appended claims or the equivalents thereof.

What is claimed is:

1. A recording system comprising:
a transmission apparatus including:
a storage unit configured to store content data,
a generating unit configured to generate recording destination information specifying a recording destination of the content data, and
a transmission control unit configured to transmit the recording destination information and the content data; and
a recording apparatus including:
a first recording unit configured to record content data,
a second recording unit configured to record content data on a recording medium at a recording speed lower than that of the first recording unit, and
a recording control unit configured to receive the recording destination information from the transmission apparatus and control the first recording unit and the second recording unit on the basis of the recording destination information,
wherein the transmission control unit continuously transmits a plurality of pieces of recording destination information each specifying a recording destination and a plurality of pieces of content data to the recording apparatus,
wherein the recording control unit records, when the recording destination specified by the recording destination information is a recording medium, the content data and the recording destination information in the first recording unit, and records the content data on the recording medium on the basis of the recording destination information recorded in the first recording unit,
wherein the transmission control unit of the transmission apparatus is configured to start transmitting the recording destination information and the content data for recording by the recording apparatus without receipt of an indication that the recording medium is inserted in the recording apparatus, and
wherein the recording control unit is configured to transmit a content data recording completion signal to the transmission apparatus after completion of recording of the content data in the first recording unit and before completion of recording of the content data on the recording medium, and thereafter (i) the transmission control unit of the transmission apparatus is configured to start transmitting second recording destination information and second content data for recording by the recording apparatus and (ii) the recording control unit is configured to start recording the second content data and the second recording destination information in the first recording unit before the completion of recording of the previous content data on the recording medium.

2. The system according to claim 1, wherein the transmission control unit deletes the content data from the storage unit after receiving the content data recording completion signal from the recording apparatus.

3. The system according to claim 1, wherein transmission of the content data is executed on the basis of processing defined by universal plug and play (UPnP).

4. The system according to claim 3, wherein the transmission control unit determines whether the recording apparatus can continuously receive a plurality of pieces of content data on the basis of recording destination information.

5. A transmission apparatus comprising:
a storage unit configured to store content data;
a generating unit configured to generate recording destination information specifying a recording destination of the content data; and
a transmission control unit configured to transmit the recording destination information and the content data, wherein the transmission control unit continuously transmits a plurality of pieces of recording destination information and a plurality of pieces of content data to a transmission destination, and wherein the transmission control unit is configured to start transmitting the recording destination information and the content data for recording by a recording apparatus without receipt of an indication that a recording medium associated with the recording destination information is inserted in the recording apparatus, wherein the recording control unit is configured to transmit a content data recording completion signal to the transmission apparatus after completion of recording of the content data in the first recording unit and before completion of recording of the content data on the recording medium, and thereafter (i) the transmission control unit of the transmission apparatus is configured to start transmitting second recording destination information and second content data for recording by the recording apparatus and (ii) the recording control unit is configured to start recording the second content data and the second recording destination information in the first recording unit before the completion of recording of the previous content data on the recording medium.

6. The apparatus according to claim 5, wherein the transmission control unit deletes the content data from the storage unit after receiving a completion signal transmitted from the transmission destination.

7. A recording control method comprising the steps of:
continuously receiving a plurality of pieces of recording destination information each specifying a recording destination and a plurality of pieces of content data from a transmission apparatus;
recording the plurality of pieces of continuously received content data and the plurality of pieces of continuously received recording destination information in a recording unit; and
recording, when the recording destination specified by the recording destination information is a recording medium, the content data on the recording medium on the basis of the recording destination information recorded in the recording unit, and
wherein the transmission apparatus is configured to start transmitting the recording destination information and the content data for recording by the recording unit without receipt of an indication that the recording medium is inserted in the recording unit, wherein a content data recording completion signal is transmitted to the transmission apparatus after completion of recording of the content data in the recording unit and before completion of recording of the content data on the recording medium, and thereafter (i) the transmission apparatus is configured to start transmitting second recording destination information and second content data for recording and (ii) the recording of the second content data and the second recording destination information is started in the recording unit before the completion of recording of the previous content data on the recording medium.

8. A non-transitory computer readable recording medium storing a program causing a computer to execute a method, the method comprising the steps of:
continuously receiving a plurality of pieces of recording destination information each specifying a recording destination and a plurality of pieces of content data from a transmission apparatus;
recording the plurality of pieces of continuously received content data and the plurality of pieces of continuously received recording destination information in a recording unit; and
recording, when the recording destination specified by the recording destination information is a second recording medium, the content data on the second recording medium on the basis of the recording destination information recorded in the recording unit,
wherein the transmission apparatus is configured to start transmitting the recording destination information and the content data for recording by the recording unit without receipt of an indication that the second recording medium is inserted in the recording unit, and
wherein a content data recording completion signal is transmitted to the transmission apparatus after completion of recording of the content data in the recording unit and before completion of recording of the content data on the recording medium, and thereafter (i) the transmission apparatus is configured to start transmitting second recording destination information and second content data for recording and (ii) the recording of the second content data and the second recording destination information is started in the recording unit before the completion of recording of the previous content data on the recording medium.

* * * * *